United States Patent [19]

Gnutti et al.

[11] Patent Number: 4,684,037

[45] Date of Patent: Aug. 4, 1987

[54] PERFECTED MECHANICAL CONTROL DEVICE FOR BALL VALVE TYPE VALVE SYSTEMS

[76] Inventors: Giuliano Gnutti; Giordano Gnutti, both of Via Rango 18, 25065 Lumezzane S.S. (Brescia), Italy

[21] Appl. No.: 629,450

[22] Filed: Jul. 10, 1984

[30] Foreign Application Priority Data

Jan. 6, 1984 [IT] Italy ............................. 19069 A/84

[51] Int. Cl.⁴ ............................................. B67B 7/24
[52] U.S. Cl. ..................................... 222/3; 251/243; 251/253; 251/310; 169/71
[58] Field of Search ............... 251/252, 251, 253, 256, 251/262, 310, 90, 243, 244, 246; 74/99 A, 99 R, 96, 107; 169/71, 74; 222/3, 505

[56] References Cited

U.S. PATENT DOCUMENTS

| | | | |
|---|---|---|---|
| 2,558,260 | 6/1951 | Maky | 251/310 |
| 2,753,945 | 7/1956 | Beebee et al. | 251/91 |
| 2,822,054 | 2/1958 | Howard | 169/71 |
| 2,929,406 | 3/1960 | Anderson | 251/310 |
| 2,974,646 | 3/1961 | Miller et al. | 74/99 |
| 2,998,805 | 9/1961 | Usab | 74/99 A |
| 3,096,966 | 7/1963 | McFarland | 251/251 |
| 3,183,792 | 5/1965 | Allen | 74/99 |
| 3,319,925 | 5/1967 | Kojima et al. | 74/99 |
| 4,019,584 | 4/1977 | Allmendinger | 169/74 |

Primary Examiner—Larry Jones
Assistant Examiner—Noah Kamen
Attorney, Agent, or Firm—Bucknam and Archer

[57] ABSTRACT

An improved mechanical control device for ball valve type valve systems operable by one hand, in which actuation of the valve ball is caused by squeezing a pair of levers, one fixed lever rigidly attached to the valve housing, the other movable lever pivotably attached to the valve housing and upon squeezing, causing a gudgeon pin to translate, which in turn causes the valve ball to rotate.

9 Claims, 6 Drawing Figures

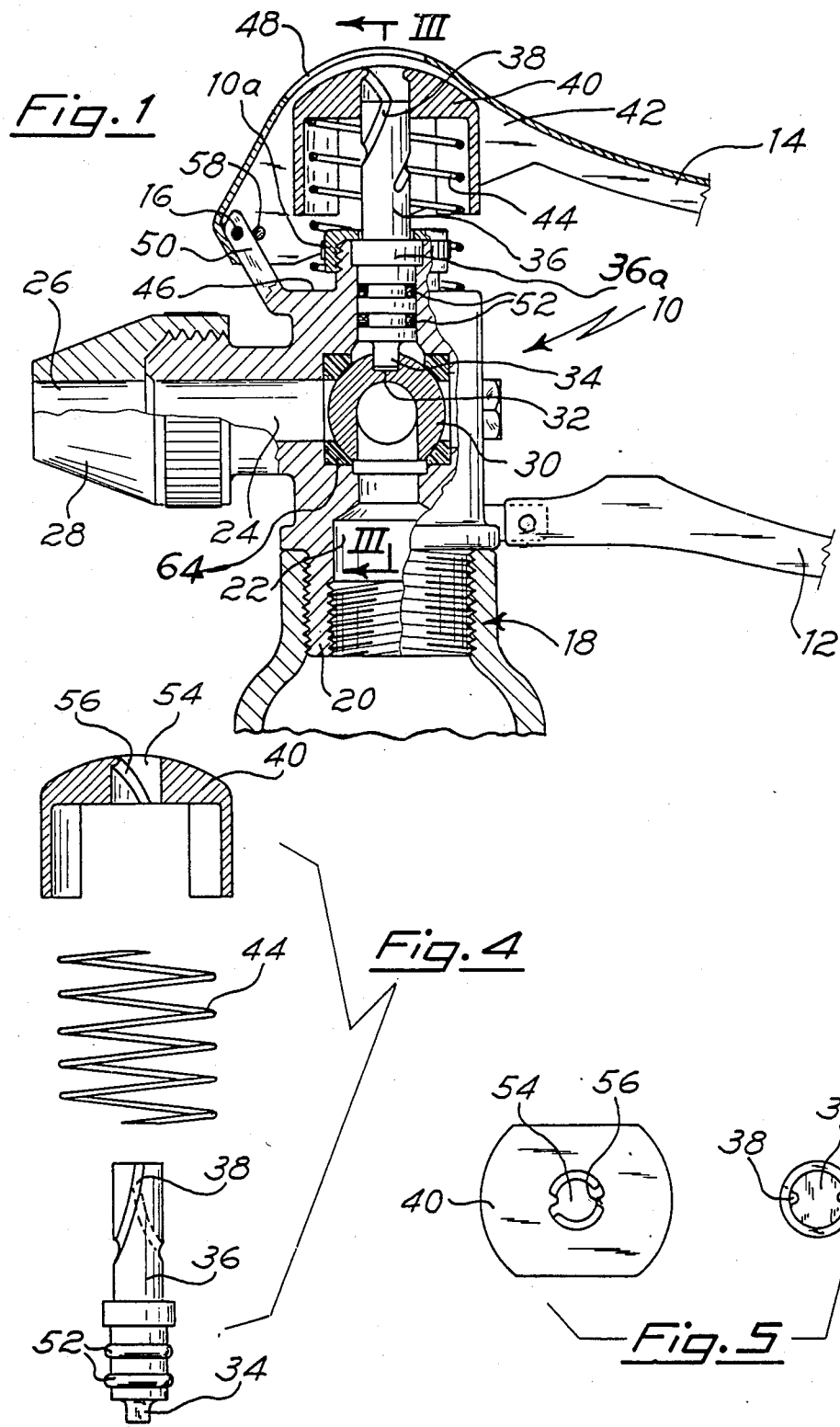

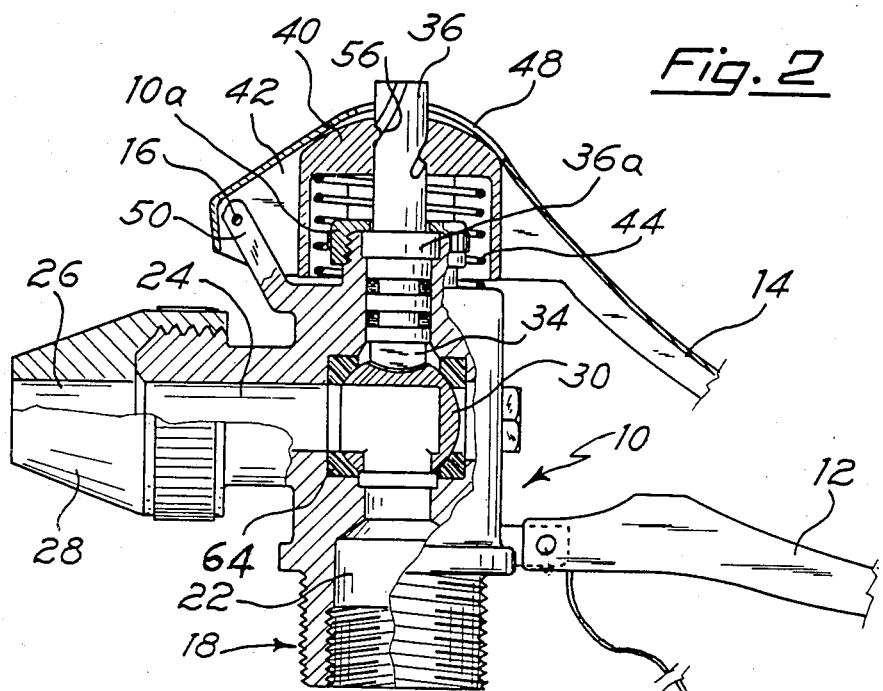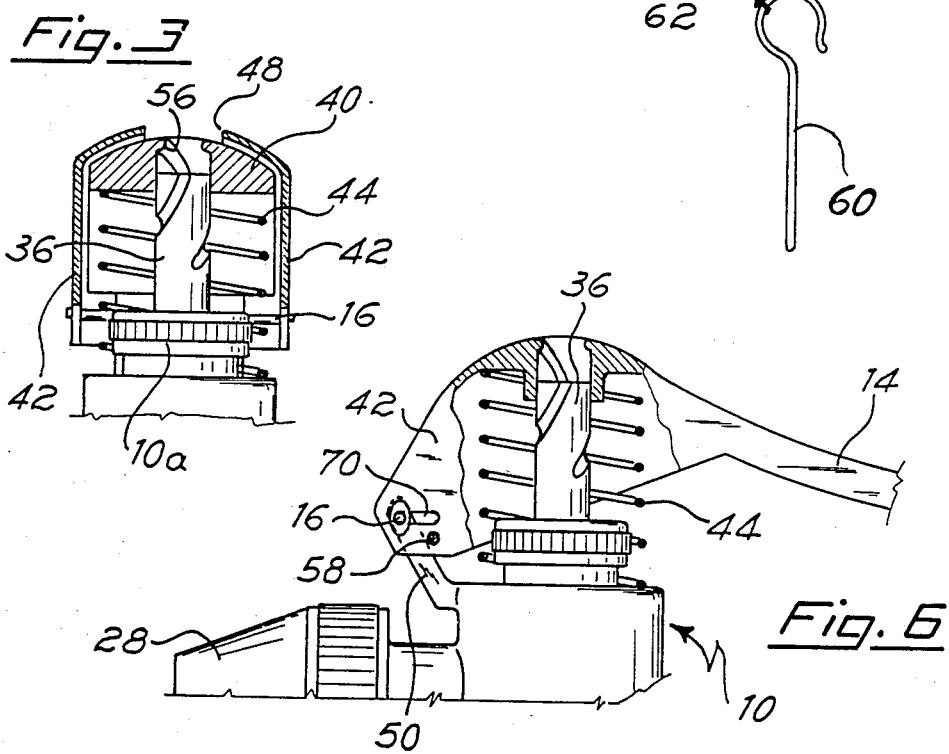

PERFECTED MECHANICAL CONTROL DEVICE FOR BALL VALVE TYPE VALVE SYSTEMS

BACKGROUND OF THE INVENTION

1. Field of Invention

This invention refers to an improved mechanical control device of ball valve type valve systems. More in particular this invention refers to an improved mechanical control device of ball valve type valve systems, for extinguishers and for containers fitted with opening and closing means in general for the controlled delivery of a pressurized fluid.

2. Description of the Prior Art

As is known, the opening and closing of ball valve type valve systems is normally achieved by the rotation of a hand-wheel which causes the rotation of a valve body. The valve includes a valve ball having passages which intersect with one another at a right angle and which set at least two passages into mutual communication: one of which is the opening to the gas cylinder containing the pressurized and generally liquified gas, and the other is a discharge and delivery port of the fluid.

These known hand-wheel type control devices have certain drawbacks and limitations. The most common of these drawbacks is caused by the hand-wheel itself, or by other means which require rotation to effect the opening and closing operation. This rotation necessarily requires manipulation which cannot be performed by the same hand that supports the gas cylinder. This drawback is particularly experienced in the case of an extinguisher which must be handled rapidly and with reasonable accuracy to direct the extinguishing medium in the most appropriate direction to strike the base of the flames to be extinguished.

"Needle" type valve systems are also known in which the hand-wheel is replaced by a lever mechanism. However, the known needle type valve systems do not guarantee the necessary air tightness to prevent the pressurized fluid contained in the extinguisher cylinder from escaping. Furthermore, in these needle type valve systems, the discharge is not efficiently controlled and gradual. An additional drawback is caused by the fact that in the known needle type systems parasitic phenomena are created, termed "water hammer", caused by the sudden interruption of the liquid flow, for example when extinguishing with water from the local water mains. In these instances, closure of the valve means causes a sudden stoppage of the water column upstream, causing the "water hammer" effect.

SUMMARY OF THE INVENTION

The object of this invention is to provide a mechanical control device for valve systems which does not have the above mentioned drawbacks of known devices.

In particular, the object of this invention is to provide a mechanical control device for valve systems, the manipulation of which may be effected in a comfortable and easy way using the same hand that supports the gas cylinder. These and other objects are achieved by a valve ball with right angled passages, the rotation of which is caused by a mechanical system which transforms a straight translation movement into a rotation movement. In particular, this rotation movement is imparted to a gudgeon pin, co-axial to the discharge port of the cylinder (inlet port of the valve housing) and fixed to the valve ball. The gudgeon pin is torsionally bound to a notch prearranged in the valve ball and engages helical projections inside a female component. This imparts a rotation of sufficient amplitude on the valve ball to obtain virtually the complete opening and closing of the passages through which the extinguishing fluid is discharged.

Sealing means, such as O-rings are provided to ensure tightness between the said pin and the female component inside which the latter rotates. Furthermore, the device is fitted with at least one return means, such as a spring, to restore the components of the device to their rest position. Movement of the gudgeon pin is caused by rotation of a lever about an axis formed by a journal that connects this lever to the valve housing.

To facilitate rotation of the lever, a second fixed lever is provided, so that the operator, by using the fingers of just one hand, can simultaneously grip the first lever (moveable) and the second lever (fixed) to handle the complete extinguisher, and to direct the jet wherever necessary and desired. Therefore, it can be understood that this invention does not include a hand wheel or similar means, and may be handled and manipulated freely and efficiently. In a variation of this invention, the female component bearing the helical part which engages the gudgeon pin, may be formed integral with the movable lever. The hinging arrangement of the lever, with respect to the fixed lever, in this case includes an elongated slot which permits limited translation of the moveable lever with respect to the journal axis to accomodate the necessary relative displacements.

The "pitch" of the helical system, which determines the degree of rotation of the valve ball is selected in accordance with its geometrical relationship with the diameters of the passages which intersect one another inside the said valve ball.

This invention may be equipped with a safety split pin which is inserted inside coaxially prearranged holes in the sides of the moveable lever, to prevent its accidental displacement with respect to the fixed lever.

A small pressure gauge which indicates the content of the gas cylinder and marks the possible empty condition, may be added, in accordance with the known technique.

DESCRIPTION OF THE DRAWINGS

The structural and functional characteristics of this control device can be better understood from the following detailed description in which reference is made to the figures of the attached drawings that represent a preferred, illustrative embodiment of the invention, and in which:

FIG. 1 represents, partially in cross-section, a non-limiting example of an embodiment of this invention, applied to an extinguisher in the closed condition of the passages;

FIG. 2 represents the same view as FIG. 1, but in the open condition;

FIG. 3 represents a partial cross-section of FIG. 1 taken on the flat and in the direction indicated by III—III;

FIG. 4 represents the components of this invention, partially in cross-section and in the form commonly referred to as an "exploded view";

FIG. 5 represents a schematic axial view of the male and female components causing the transformation of an axial movement into a rotary movement of the valve ball, and FIG. 6 is analogous to FIG. 1, but represents, in a side view and partially in cross-section, an alternate embodiment of the device, in which the moveable lever may undergo some displacements.

DESCRIPTION OF THE PREFERRED EMBODIMENTS

With reference to the attached drawings and in particular to FIGS. 1, 2 and 3, the device 10, which for simplicity will be termed "stationary", includes a fixed lever 12 and a moveable lever 14, pivoted about a journal 16. The distance between these two levers 12 and 14 permits them to be gripped between the fingers of one hand only, and a container, whose mouth engages the threaded end 18 of the element 20 of the valve device, can be easily handled. The element 20 is equipped with an axial passage 22 which intersects (at a right angle, in the embodiment example) with an orthogonal passage 24. The latter terminates in an orifice 26 in the exit nozzle 28.

The valve means includes a valve ball 30 in which corresponding passages are pre-arranged so that, by rotation of the valve ball itself, they align themselves along the entry passage 22 and the exit passage 24, respectively, setting them into communication with one another.

Rotation of the valve ball 30 is achieved via the manual displacement of the moveable lever 14 towards the fixed lever 12. The upper part of the valve ball 30 has a notch 32 which engages a shaped projection 34 at one end of the gudgeon pin 36. One or more helical grooves 38 at the other end engages the projecting helical part 56 of a female component 40 which is fixed between the sides 42 of the moveable lever 14.

Axial movement of the gudgeon pin 36 is limited by the effect of a ring nut 10a, tightened on the threaded end of the valve 10, against a collar 36a on the gudgeon pin.

In operation, squeezing the moveable lever 14 towards the fixed lever 12, causes the female component 40 to move downwards. The projections 56, which engage in the grooves 38, force the gudgeon pin 36 to turn about its axis turning the valve ball in a direction determined by the inclination of the helical grooves 38.

This transforms the axial movement of the female component 40 into a rotary movement of the gudgeon pin 36 and the valve ball 30.

It is obvious that the rotation of the valve ball 30 is gradual and is a function of the amplitude of the movement of the moveable lever 14, which precludes the objectionable "water hammer" phenomenon. A spring 44, or other elastic means is arranged inside, and hooded by, the femal component. This spring 44 is bound between the internal surface of the female component 40 and the surface 46 of the valve 10. Thus, the spring 44 elastically opposes the vertical downward movement of the female component 40 and of the moveable lever 14 and provides the desired return to the rest configuration.

As depicted in FIGS. 1 and 2, the moveable lever 14 is suitably shaped to facilitate handling, and to form a hood over the translation mechanism. Its upper part has an opening 48 so as not to interfere with the movement of the gudgeon pin 36. As already mentioned the moveable lever 14 rotates about the journal axis 16 which is supported by a projection 50, integral with the valve 10.

The journal axis 16 is orthogonal to, and displaced with respect to, the axis of the gudgeon pin 36.

The valve ball 30 rotates in a sealed space between opposing gaskets 64 made from any known suitable material to ensure a low frictional resistance. Similarly, the air-tight seal of the gudgeon pin 36 is ensured by known O-rings 52 pre-arranged in circumferential grooves thereon.

In FIGS. 4 and 5, the essential elements of the valve ball 30 control are seen to consist of a female component 40 having a hole 54 with helical projections 56, which engage the matching grooves 38 of the gudgeon pin 36, so arranged as to obtain the desired transformation of an axial movement into the rotary movement of the valve ball 30.

A safety split pin 60 can be inserted inside holes 58, pre-arranged in the sides 42 of the moveable lever 14. The split pin 60 can be bound, by means of a flexible element 62, in a known manner, to one of the levers, preferably to the fixed lever 12. A small pressure gauge, (not shown) capable of indicating the charge conditions of the extinguisher, can be added.

A variation of the moveable lever is illustrated in FIG. 6. Here the female component 40 is formed by the moveable lever 14, the sides 42 of which have slotted holes 70 for the translation of the lever itself along the journal axis 16 during operation of the device.

The remaining components are analogous to those illustrated in the previous figures.

The invention has been illustrated and described as applied to a cylinder containing a fluid under pressure.

As this valve is capable of achieving a gradual and controlled variation of the opening and closure of the passages, and is therefore capable of avoiding "water hammer" as described above, it may be equally advantageously applied to pipe systems.

The device has been illustrated and described in a preferred embodiment. However, it is obvious that many variations, changes and modifications may be made in other embodiments. It is understood that such variations, modifications and changes fall within the protective context of this invention.

What we claim is:

1. A container having a pressurized fluid and a valve system of the ball valve type for controlling the delivery of said pressurized fluid from said container and a control device for said valve system operable by the user with one hand, which comprises:
   (a) a valve housing having a supply end, a discharge end, a perpendicular intersecting pair of passages connecting said ends a projection and an exterior surface;
   (b) said ball valve housing passages which intersect at right angles located at the intersection of said perpendicular passages to control flow from said supply end of said valve housing to said discharge end;
   (c) means for converting linear motion to rotational motion so as to rotate said ball valve which comprise:
   (d) a male component comprising a gudgeon pin, located on said housing said gudgeon pin having an axis coaxial with said supply end of said valve housing and having a fixed end and a free end, said fixed end being torsionally fastened to said ball and having a plurality of circumferential grooves, said free end having a helical groove;

(e) a journal attached to said projection of said valve housing, said journal having an axis, said axis being orthogonal to the axis of said gudgeon pin;

(f) a lever, movable about said journal, having an inverted U-shaped cross section, and having a through hole in the upper part of said inverted U-shaped cross section and coaxial holes on sides thereof;

(g) a female component displaceably controlled by said movable lever and having a bore defining an inner surface, said bore having a helical projection on said inner surface, said helical projection engaging with said helical groove of said gudgeon pin, said female component being located between said sides of said movable lever, whereby it is displaced along the axis of the gudgeon pin to rotate said ball valve via said gudgeon pin so as to selectively control flow from said container when said movable lever is actuated, wherein the axis of said journal passes through said coaxial holes and said gudgeon pin passes through said through-hole in said movable lever and a fixed lever is rigidly attached to said valve housing and is located at a distance from said movable lever that both said levers are adapted for one-handed actuation.

2. The container as recited on claim 1, wherein collar means located on said gudgeon pin prevents axial displacement of said gudgeon pin.

3. The container as recited in claim 1, wherein a plurality of O-ring seals are inserted in said circumferential grooves to provide a fluid tight seal between said gudgeon pin and said valve body.

4. The container according to claim 1 wherein said ball has an upper surface and a notch in said upper surface and said fixed end of said gudgeon pin engages in said notch.

5. The container according to claim 1 which comprises a spring located between said exterior surface of said valve housing and said inner surface of said female component, said spring elastically opposing the motion of said female component and of said movable lever towards said valve body and biasing said ball valve to a closed position.

6. The container according to claim 1 wherein said movable lever is pivotable about said journal.

7. The container according to claim 1 wherein said female component is an integral part of said movable lever.

8. The container according to claim 7 wherein said movable lever moves coaxially with respect to said gudgeon pin.

9. The container according to claim 1 wherein a safety split pin is flexibly tethered to said valve housing for insertion into a second set of coaxial hole means for preventing activation of said movable lever.

* * * * *